United States Patent
Deshmukh et al.

(10) Patent No.: US 11,798,151 B1
(45) Date of Patent: Oct. 24, 2023

(54) SYSTEMS AND METHODS FOR DETERMINING IMAGE CAPTURE DEGRADATION OF A CAMERA SENSOR

(71) Applicant: Rivian IP Holdings, LLC, Irvine, CA (US)

(72) Inventors: Utkarsh Deshmukh, Cupertino, CA (US); Martin Fritz Mueller, San Jose, CA (US); Angelo Anthony Stekardis, Jr., Issaquah, WA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/728,747

(22) Filed: Apr. 25, 2022

(51) Int. Cl.
*G06T 7/00* (2017.01)
*H04N 23/81* (2023.01)

(52) U.S. Cl.
CPC ......... *G06T 7/0002* (2013.01); *H04N 23/811* (2023.01); *G06T 2207/10016* (2013.01); *G06T 2207/30168* (2013.01)

(58) Field of Classification Search
CPC . G06T 7/0002; G06T 7/70; G06T 7/11; G06T 5/002; G06T 2207/10016; G06T 2207/30168; H04N 23/811; G06V 10/40
See application file for complete search history.

(56) References Cited

U.S. PATENT DOCUMENTS

| | | | | |
|---|---|---|---|---|
| 7,676,110 B2 * | 3/2010 | Steinberg | ............... | H04N 23/81 348/241 |
| 7,683,934 B2 * | 3/2010 | Montminy | ............. | G08B 29/26 348/207.99 |
| 8,503,719 B2 * | 8/2013 | Deschamps | ........... | G06T 7/0004 382/101 |
| 8,717,456 B2 * | 5/2014 | Johnson | ..................... | G06T 5/10 348/222.1 |
| 8,989,493 B1 * | 3/2015 | Huang | .................... | G06T 5/001 382/173 |
| 9,633,419 B2 * | 4/2017 | Baek | ....................... | H04N 25/60 |
| 10,191,356 B2 * | 1/2019 | Laroia | ................ | G02B 27/0006 |
| 11,142,124 B2 * | 10/2021 | Mandai | ..................... | G06T 7/12 |

(Continued)

OTHER PUBLICATIONS

Golestaneh et al., "Spatially-varying blur detection based on multiscale fused and sorted transform coefficients of gradient magnitudes," 2017 IEEE Conference on Computer Vision and Pattern Recognition (CVPR), Honolulu, HI, USA, pp. 596-605 (2017).

*Primary Examiner* — Brian P Yenke
(74) *Attorney, Agent, or Firm* — HALEY GUILIANO LLP (57) ABSTRACT

A system for determining image capture degradation of a camera sensor is disclosed. The system is configured to capture a series of image frames by a camera of a vehicle over time. The system is configured to generate a latent image from a series of images captured by the camera. The system generates a plurality of frequency layers based on the latent image by, for example, performing a high frequency multiscale fusion transform. The system generates a plurality of frequency layers, each corresponding a spectral sub-band frequency, and each frequency layer includes the coefficients. The system generates a degradation map based on the processed activation map and generates an output based on the activation map. The output may be provided to an output system to wash the camera lens, notify a user or the vehicle of blockage, or modify image processing.

20 Claims, 9 Drawing Sheets

(56) References Cited

U.S. PATENT DOCUMENTS

| | | | |
|---|---|---|---|
| 11,223,782 B2* | 1/2022 | Runia | G06N 3/04 |
| 11,354,795 B2* | 6/2022 | Asayama | G06T 7/11 |
| 11,508,049 B2* | 11/2022 | Seo | G06F 18/217 |
| 2005/0068451 A1* | 3/2005 | Steinberg | H04N 23/811 |
| | | | 348/241 |
| 2008/0226148 A1* | 9/2008 | Gu | G06T 5/007 |
| | | | 382/128 |
| 2010/0182450 A1* | 7/2010 | Kumar | H04N 1/00007 |
| | | | 348/E5.025 |
| 2010/0321537 A1* | 12/2010 | Zamfir | G06T 5/002 |
| | | | 348/241 |
| 2012/0045148 A1* | 2/2012 | Moriya | G06F 18/00 |
| | | | 382/284 |
| 2017/0301095 A1* | 10/2017 | Zhang | G06T 7/11 |
| 2018/0070015 A1* | 3/2018 | Hubei | H04N 23/6811 |
| 2019/0138821 A1* | 5/2019 | Mu | G05D 1/0088 |
| 2020/0380269 A1* | 12/2020 | Mu | G05D 1/0088 |
| 2021/0088441 A1* | 3/2021 | Oki | G01N 21/4738 |
| 2021/0133940 A1* | 5/2021 | Li | H04N 23/70 |
| 2022/0141449 A1* | 5/2022 | Pieper | H04N 17/002 |
| | | | 348/175 |
| 2022/0327323 A1* | 10/2022 | Deshmukh | G06V 20/56 |
| 2023/0056564 A1* | 2/2023 | Han | G06V 10/771 |

* cited by examiner

SYSTEMS AND METHODS FOR DETERMINING IMAGE CAPTURE DEGRADATION OF A CAMERA SENSOR

INTRODUCTION

The present disclosure is directed towards systems and methods for determining image capture degradation of a camera and, more particularly, for determining image capture degradation of a camera using a high frequency multiscale fusion transform.

SUMMARY

In some embodiments, present disclosure is directed to a method for determining image capture degradation of a camera sensor. The method includes capturing, via one or more sensors, a series of image frames by a camera of a vehicle over time. The method includes generating a latent image from a series of image frames captured by a camera of a vehicle over time using processing circuitry. The latent image represents temporal and/or spatial differences among the series of image frames over time. In an embodiment, the latent image is generated by determining the pixel dynamic range of the series of images. In another embodiment, the latent image is generated by determining the gradient dynamic range of the series of images. In another embodiment, the latent image is generated by determining the temporal variance of each pixel of the series of images. In another embodiment, the latent image is generated by determining the average gradient of the series of images. In some embodiments, the image gradient is determined by applying a sobel filter or a bilateral filter. The method includes generating, using processing circuitry and based on the latent image, a plurality of frequency layers. Each of the frequency layers corresponds to a frequency-based decomposition of the latent image at a respective scale and frequency. In some embodiments, the method generates the frequency layer using a high frequency fusion transform. In some embodiments, the method performs the high frequency fusion transform at a single scale. In other embodiments, the method performs the high frequency fusion transform at multiple scales. The method includes identifying image capture degradation based on the plurality of frequency layers using the processing circuitry.

In some embodiments, generating the plurality of frequency layers includes determining, for each of a plurality of scales centered at each of a plurality of positions in the late image, a plurality of frequency-based coefficients. In some embodiments, the frequency-based coefficients correspond to a plurality of spectral sub-band frequencies. In some embodiments, each of the plurality of frequency layers contain frequency-based coefficients for a respective one of the spectral sub-band frequencies. In some embodiments, identifying image capture degradation includes selecting a subset of the coefficients based on a frequency magnitude threshold.

In some embodiments, the frequency layers are determined by performing a high-frequency multiscale fusion transform on the latent image.

In some embodiments, generating a plurality of frequency layers further includes selecting a subset of coefficients based on their frequency. The method includes sorting the subset of frequency-based coefficients with respect to magnitude. The method includes normalizing the sorted subset of frequency-based coefficients to generate the plurality of layers.

In some embodiments, the camera captures the series of image frames at a sample frequency and the sample frequency is determined based on vehicle speed. In some embodiments, the image frames are excluded from the series of image frames when vehicle speed is below a predetermined threshold.

In some embodiments, the method includes adjusting the frequency magnitude threshold.

In some embodiments, the method includes determining, based on the identified image capture degradation, whether blockage is present. The method includes applying a fluid to a face of the camera using a vehicle washing system in response to determining that blockage is present.

In some embodiments, the method includes generating, on a display device, a notification indicative of image capture degradation.

In some embodiments, the method includes disregarding one or more regions of one or more the image frames based on the image degradation.

In some embodiments, the present disclosure is directed to a system for determining image capture degradation. The system includes a camera system and control circuitry. The camera is configured to capture a sequence of images. The control circuitry is coupled to the camera and configured to generate a latent image from a series of image frames captured by the camera. The latent image represents temporal and/or spatial differences among the series of image frames over time. In an embodiment, the latent image is generated by determining the pixel dynamic range of the series of images. In another embodiment, the latent image is generated by determining the gradient dynamic range of the series of images. In another embodiment, the latent image is generated by determining the temporal variance of each pixel of the series of images. In another embodiment, the latent image is generated by determining the average gradient of the series of images. In some embodiments, the image gradient is determined by applying a sobel filter or a bilateral filter. The control circuitry generates a plurality of frequency layers based on the latent image. Each of the frequency layers corresponds to a frequency-based decomposition of the latent image at a respective scale and frequency. In some embodiments, the control circuitry generates the frequency layer using a high frequency fusion transform. In some embodiments, the control circuitry performs the high frequency fusion transform at a single scale. In other embodiments, the control circuitry performs the high frequency fusion transform at multiple scales. The control circuitry identifies image capture degradation based on the plurality of frequency layers using the processing circuitry.

In some embodiments, the camera is integrated into a vehicle, and the camera captures the series of image frames at a sample frequency based on the vehicle's speed.

In some embodiments, image frames are excluded from the latent image when captured while the vehicle's speed is below a predetermined threshold.

In some embodiments, the control circuitry disregards the camera output.

In some embodiments, the system includes a washing system that applies a fluid to the face of the camera.

In some embodiments, the system includes a display device configured to display a notification indicative of a blockage event.

In some embodiments, the present disclosure is directed to a non-transitory computer readable medium. The non-transitory computer readable medium includes program instructions for image capture degradation. In some embodiments, the program instructions cause a computer processing system to execute steps including capturing a series of image frames by a camera. The steps also include generating a latent image from a series of image frames captured by a camera of a vehicle over time using processing circuitry. The latent image represents temporal and/or spatial differences among the series of image frames over time. In an embodiment, the latent image is generated by determining the pixel dynamic range of the series of images. In another embodiment, the latent image is generated by determining the gradient dynamic range of the series of images. In another embodiment, the latent image is generated by determining the temporal variance of each pixel of the series of images. In another embodiment, the latent image is generated by determining the average gradient of the series of images. In some embodiments, the image gradient is determined by applying a sobel filter or a bilateral filter. The steps further include generating, using processing circuitry and based on the latent image, a plurality of frequency layers. Each of the frequency layers corresponds to a frequency-based decomposition of the latent image at a respective scale and frequency. In some embodiments, the steps further include generating the frequency layer using a high frequency fusion transform. In some embodiments, the steps include performing the high frequency fusion transform at a single scale. In other embodiments, the steps include performing the high frequency fusion transform at multiple scales. The steps include identifying image capture degradation based on the plurality of frequency layers using the processing circuitry.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

Image degradation can occur due to various reasons such as, for example, dirt accumulation over the camera lens, bird droppings, placement of an object on or near the camera, and environmental factors such as the camera being point in the general direction of an intense light source. Additionally, image degradation can be caused by camera blur, fogging, or other obstructions that may cause degradation of the image captured by the camera. Such image degradation reduces the quality of the images, and potentially rendering them unusable for other algorithms or by a vehicle occupant. The systems and methods of the present disclosure are directed to determining which parts of the image frames are degraded and responding to the image degradation.

Figure 1:
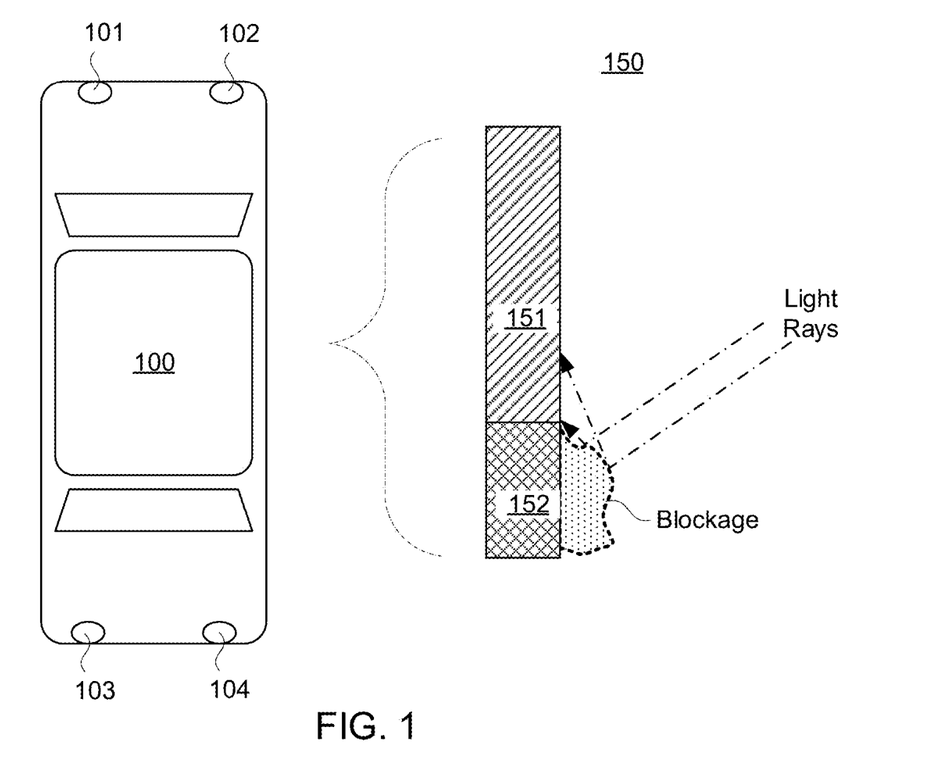
FIG. 1 depicts a top view of an illustrative vehicle having several cameras, in accordance with some embodiments of the present disclosure.

FIG. 1 shows a top view of illustrative vehicle 100 having several cameras, in accordance with some embodiments of the present disclosure. As illustrated, vehicle 100 includes cameras 101, 102, 103, and 104, although it will be understood that a vehicle may include any suitable number of cameras in accordance with the present disclosure (e.g., one camera, more than one camera). Additionally, although the present disclosure may show, discuss, or describe a camera, any image capture device may be implemented without departing from the contemplated embodiments. For example, any device that generates a photochemical, digital, or analog representation of an environment may be used including those captured by a video camera, a photographic camera, an infrared camera, a radar device, or lidar device, may be implemented according to the techniques described herein, without departing from the contemplated embodiments.

Panel 150 illustrates a cross-section view of a camera exhibiting a blockage. In the illustrative embodiment depicted, the blockage covers portion 152 of the camera, while portion 151 is uncovered (e.g., although portion 151 may be affected by the blockage, for example). The blockage may completely cover portion 152 and may effectively cover at least some of portion 151 (e.g., from an uneven distribution of reflected light from the blockage). The blockage may become lodged on the camera, and may persist for some time (e.g., falling off, dissipating, or remaining for an extended period of time). In some embodiments, the systems and methods of the present disclosure are directed to determining which portions of the image are degraded (e.g., caused by a blockage), as well as responding to the degradation by clearing the blockage, disregarding images exhibiting degradation, modifying image processing for output from the camera, generating a notification of the degradation and/or blockage, any other suitable function, or any combination thereof. Although the present disclosure discusses embodiments where the blockage obscures a portion of a camera and thus may cause image degradation, the contemplated embodiments include those where the entirety of the camera's view is obscured by the blockage or the image is completely depredated.

Figure 2:
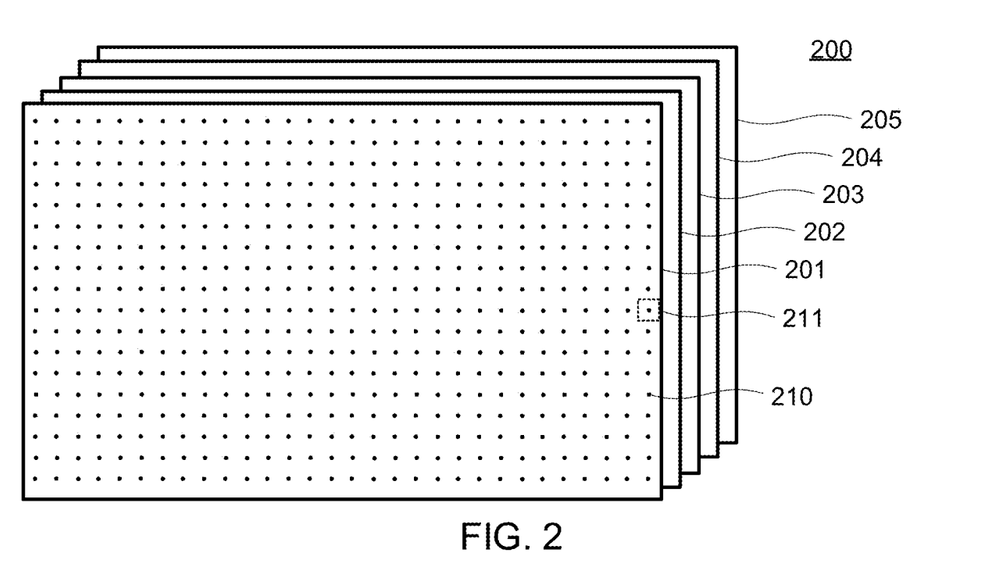
FIG. 2 depicts a diagram of an illustrative output from a camera, in accordance with some embodiments of the present disclosure.

FIG. 2 depicts a diagram of illustrative output 200 from a camera, in accordance with some embodiments of the present disclosure. As illustrated, output 200 includes a plurality of captured images 201-205, indexed in time (e.g., the images are subsequent). Although images may be shown and described, any photochemical, digital, or analog representation may be used including those captured from a video camera, a photographic camera, in infrared camera, a radar device, or lidar device, may be implemented without departing from the contemplated embodiments.

A partition grid, of which point 210 is illustrated, is applied to images 201-205 to define regions. In some embodiments, point 210 corresponds to a single pixel of image 201. Region 211 corresponds to one location of the partition grid. The partition grid includes N×M points, while region 211 may correspond to a particular number of pixels (e.g., 7×7 pixels, 9×9 pixels, or any other A×B set of pixels) that correspond to each point. For example, images 201-205 may each include (N*A)×(M*B) pixels, grouped into N×M regions each including A×B pixels. In some embodiments, the regions do not overlap. For example, every pixel may be associated with a single region (e.g., along with other pixels). In other embodiments, the regions may at least partially overlap. For example, at least some pixels may be associated with more than one region (e.g., adjacently indexed regions). In further embodiments, the regions do not overlap and are spaced apart. For example, at least some pixels need not be associated with any region (e.g., adjacently indexed regions). Any suitable regions, overlapping or not, or spaced or not spaced, or a combination thereof, may be used in accordance with the present disclosure. Additionally, differing size regions (e.g., different scales) may be implemented without departing from the contemplated embodiments.

In some embodiments, the output of one camera, or more than one camera, may be analyzed to determine whether any particular image or region of image is degraded. The partition grid need not be rectangular, and may include gaps, spaces, irregularly arranged points, an array, or a combination thereof.

Figure 3:
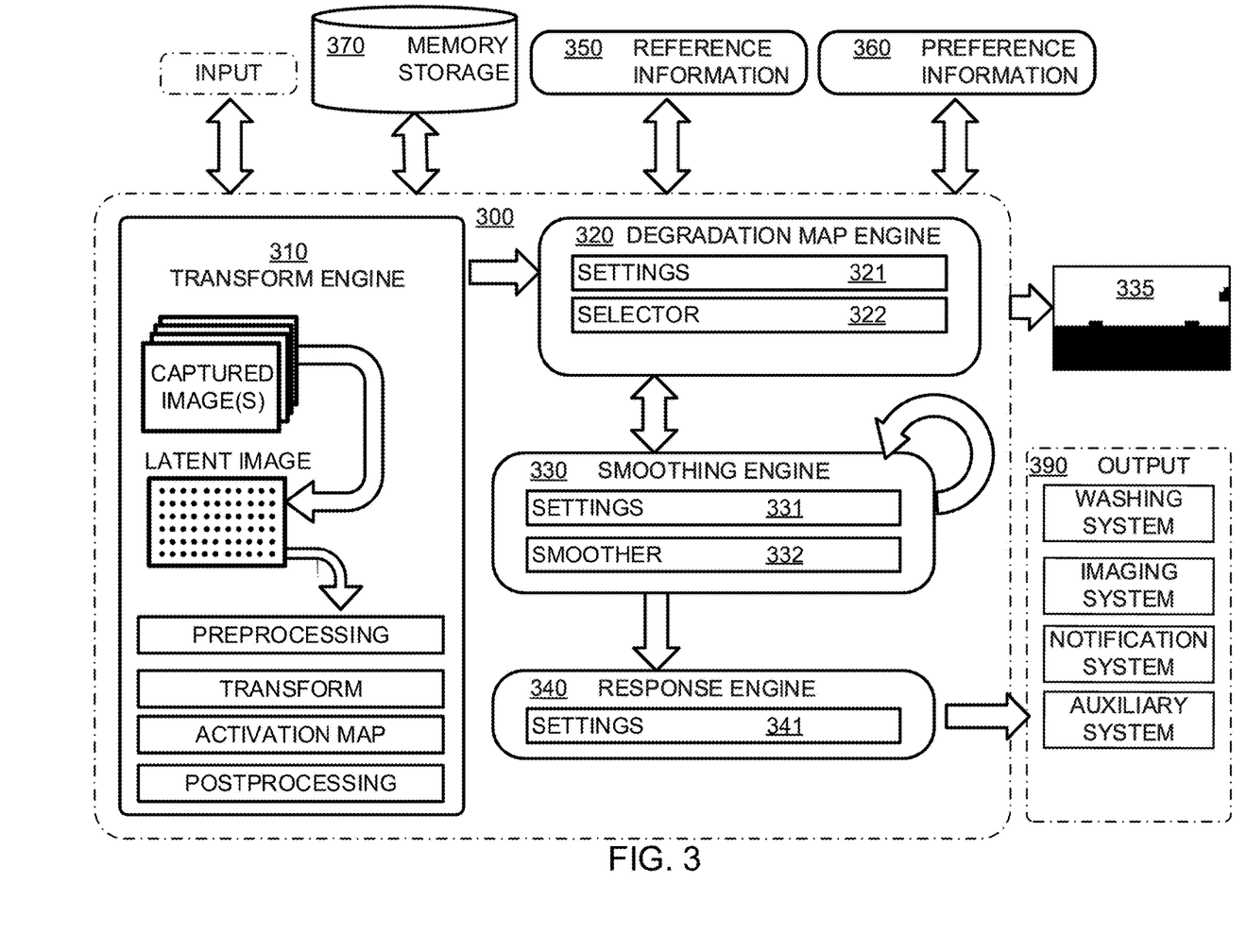
FIG. 3 depicts a system diagram of an illustrative system for determining image capture degradation of camera sensor, in accordance with some embodiments of the present disclosure.

FIG. 3 depicts a system diagram of illustrative system 300 for determining image capture degradation of a camera sensor, in accordance with some embodiments of the present disclosure. As illustrated, system 300 includes transform engine 310, degradation map engine 320, smoothing engine 330, response engine 340, reference information 350, preference information 360, and memory storage 370. It will be readily understood by one skilled in the art that the illustrated arrangement of system 300 may be modified in accordance with the present disclosure. For example, components may be combined, separated, increased in functionality, reduced in functionality, modified in functionality, omitted, or otherwise modified in accordance with the present disclosure. System 300 may be implemented as a combination of hardware and software, and may include, for example, control circuitry (e.g., for executing computer readable instructions), memory, a communications interface, a sensor interface, an input interface, a power supply (e.g., a power management system), any other suitable components, or any combination thereof. To illustrate, system 300 is configured to generate a latent image, perform a frequency-based transform on the generated latent image, create an activation map based on the transform, process the activation map, generate a degradation map, and generate or cause a suitable response based on the degradation map, or any other processes therein.

Transform engine 310 is configured to create a latent image from a series of images, preprocess the latent image, create a plurality of image layers by performing a frequency-based transform on the latent image, create an activation map based on the plurality of image layers, and perform further processing (e.g., post processing) on the activation map.

Transform engine 310 may utilize any frequency-based transform to create the plurality of image layers. For example, transform engine 310 may utilize a discrete cosine transform (DCT) to express a finite sequence of data points (e.g., image information) in terms of a sum of cosine functions oscillating at different frequencies. Although the present disclosure discusses the use of a discrete cosine transform, any type of transform may be implemented without departing from the contemplated embodiments. For example, binomial transforms, discrete Fourier transforms, fast Fourier transforms, discrete Hartley transforms, discrete sine transforms, discrete wavelet transforms, Hadamard transforms (or, Walsh-Hadamard transforms), fast wavelet transforms, Hankel transforms, discrete Chebyshev transforms, finite Legendre transforms, spherical harmonic transforms, irrational base discrete weighted transforms, number-theoretic transforms, and Stirling transforms, or any combination thereof, may be implemented without departing from the contemplated embodiments. Additionally, different types of discrete cosine transforms may be implemented including type-I DCTs, type-II DCTs, type III DCTs, type-IV DCTs, type-V DCTs, type-VI DCTs, type-VII DCTs, type-VIII DCTs, multidimensional type-II DCTs (M-D DCT-II), and multidimensional type-IV DCTs (MD-DCT-IV), or any combination thereof without departing from the contemplated embodiments.

Transform engine 310 may consider a single image (e.g., a set of one), a plurality of images, referencing information, or a combination thereof. For example, images may be captured at 5-10 frames per second, or any other suitable frame rate. In a further example, a group of images may include ten images, less than ten images, or more than ten images for analysis by transform engine 310. In some embodiments, transform engine 310 applies pre-processing to each image of the set of images to prepare the image for processing. For example, transform engine 310 may brighten one or more of the captured images or portions thereof, darken one or more of the captured images or portions thereof, color shift one or more of the captured images (e.g., among color schemes, from color to grayscale, or other mapping), crop the images, scale the images, adjusting an aspect ratio of the images, adjust contrast of an images, perform any other suitable processing to prepare images, or any combination thereof. Additionally, transform engine 310 may vary the processing techniques based on the output of transform engine 310, degradation map engine 320, smoothing engine 330, response engine 340, output 390, reference information 350, preference information 360, or any combination thereof.

In some embodiments, transform engine 310 subsamples each image by dividing the image into regions according to a grid (e.g., forming an array of regions that in aggregate constitute the image). To illustrate, referencing the subsampled grid, transform engine 310 selects a small neighborhood for every center pixel (e.g., A-by-B pixels), resulting in N×M regions. For example, to illustrate, N and M may be positive integers that may be, but need not be, equal to each other (e.g., a region can be square 7-by-7 pixels or 8-by-8 pixels; or alternatively, 10-by-6 pixels).

In some embodiments, transform engine 310 generates a latent image by receiving a plurality of images from a camera or, alternatively, images stored in a storage device (e.g., memory storage 370). The plurality of images comprises a series of images captured by, for example, a camera attached to a vehicle (e.g., camera 102). In such an example, the series of images contain visual information related to the vehicle's surrounding, e.g., roadways, roadway conditions, signage, other vehicles, etc. In accordance with the techniques and embodiments shown and described in the present disclosure, the latent image contains information relating to the temporal and/or spatial differences among the series of images from which the latent image was generated.

Smoothing engine 330 is configured to smooth output of degradation map engine 320. In some embodiments, smoothing engine 330 takes as input a degradation map from degradation map engine 320, and determines a smoothed degradation map that may, but need not, be the same as the output of degradation map engine 320. To illustrate, degradation map engine 320 may identify image degradation (e.g., caused by a blockage), or the removal of a blockage, relatively quickly (e.g., from frame-to-frame, or over the course of several frames). Smoothing engine 330 smooths this transition to ensure some confidence in a change of state (e.g., from degraded to not degraded and/or from blocked to unblocked and vice versa). For example, smoothing engine 330 may increase latency in state changes (e.g., blocked-unblocked or degraded-not degraded), reduce frequency state changes (e.g., prevent short time-scale fluctuations in state), increase confidence in a transition, or a combination thereof. In some embodiments, smoothing engine 330 applies the same smoothing for each transition direction. For example, smoothing engine 330 may implement the same algorithm and same parameters thereof regardless of the direction of the state change (e.g., blocked to unblocked, or unblocked to blocked). In some embodiments, smoothing engine 330 applies a different smoothing for each transition direction. For example, smoothing engine 330 may determine the smoothing technique, or parameters thereof, based on the current state (e.g., the current state may be "degraded," "blocked," or "unblocked"). Smoothing engine 330 may apply a statistical technique, a filter (e.g., a moving average or other discreet filter), any other suitable technique for smoothing output of degradation map engine 320, or any combination thereof. To illustrate, in some embodiments, smoothing engine 330 applies Bayesian smoothing to the output of degradation map 320. In some embodiments, more smoothing is applied for transitioning from blocked to unblocked than for transitioning from unblocked to blocked. As illustrated, smoothing engine 330 may output degradation map 335 corresponding to the smoothed degradation map values for each region. As illustrated, for example, black in degradation mask 335 corresponds to degraded regions and white in degradation mask 335 corresponds to undegraded or unblocked regions. As depicted for example, the bottom of the camera is exhibiting image degradation, which may be caused by blockage.

Response engine 340 is configured to generate an output signal based on a state determined by degradation map engine 320 and/or smoothing engine 330. Response engine 340 may provide the output signal to an auxiliary system, an external system, a vehicle system, any other suitable system, a communications interface thereof, or any combination thereof. In some embodiments, response engine 340 provides an output signal to a cleaning system (e.g., a washing system) to spray water or other liquid on a camera face (e.g., or enable a mechanical clean such as a wiper) to clear a blockage causing the degradation. In some embodiments, response engine 340 provides an output signal to, or otherwise includes a notification system to generate a notification. For example, the notification may be displayed on a display screen such as a touchscreen of a smartphone, a screen of a vehicle console, any other suitable screen, or any combination thereof. In a further example, the notification may be provided as an LED light, console icon, or other suitable visual indicator. In a further example, a screen configured to provide a video feed from the camera feed being classified may provide a visual indicator such as a warning message, highlighted area of the video feed corresponding to image degradation or camera blockage, any other suitable indication overlaid on the video or otherwise presented on the screen, or any combination thereof. In some embodiments, response engine 340 provides an output signal to an imaging system of a vehicle. For example, a vehicle may receive images from a plurality of cameras to determine environmental information (e.g., road information, pedestrian information, traffic information, location information, path information, proximity information) and accordingly may alter how images are processed in response to image degradation.

In some embodiments, as illustrated, response engine 340 includes one or more settings 341 that may include, for example, notification settings, degradation thresholds, predetermined responses (e.g., the type of output signal to generate in response to degradation mask 335), any other suitable settings for affecting any other suitable process, or any combination thereof.

In an illustrative example, system 300 (e.g., transform engine 310 thereof) may receive a set of images (e.g., repeatedly at a predetermined rate) from a camera output. Transform engine 310 generates a latent image from the set of images. Transform engine 310 may perform one or more preprocessing techniques on the latent image. Transform engine 310 performs a high frequency multiscale fusion transform to the latent image generating a plurality of frequency layers, each frequency layer corresponding to a frequency-based decomposition of the latent image. Transform engine 310 processes the plurality of frequency layers to generate an activation map that corresponds to the frequencies having the greatest coefficients among the plurality of frequency layers. Transform engine 310 may apply post-processing techniques to the activation map. The activation map is outputted to degradation map engine 320. Smoothing engine 330 receives the degradation map from degradation map engine 320, to generate a smoothed degradation map. As more images are processed over time (e.g., by transform engine 310 and degradation map engine 320), smoothing engine 330 manages changing degradation mask 335 (e.g., based on the smoothed degradation map). Accordingly, the output of smoothing engine 330 is used by response engine 340 to determine a response to a determination that the images captured from the camera are degraded by, for example, the camera being at least partially blocked or unblocked. Response engine 340 determines a suitable response, based on settings 341, by generating an output signal to one or more auxiliary systems (e.g., a washing system, an imaging system, a notification system).

Figure 4:
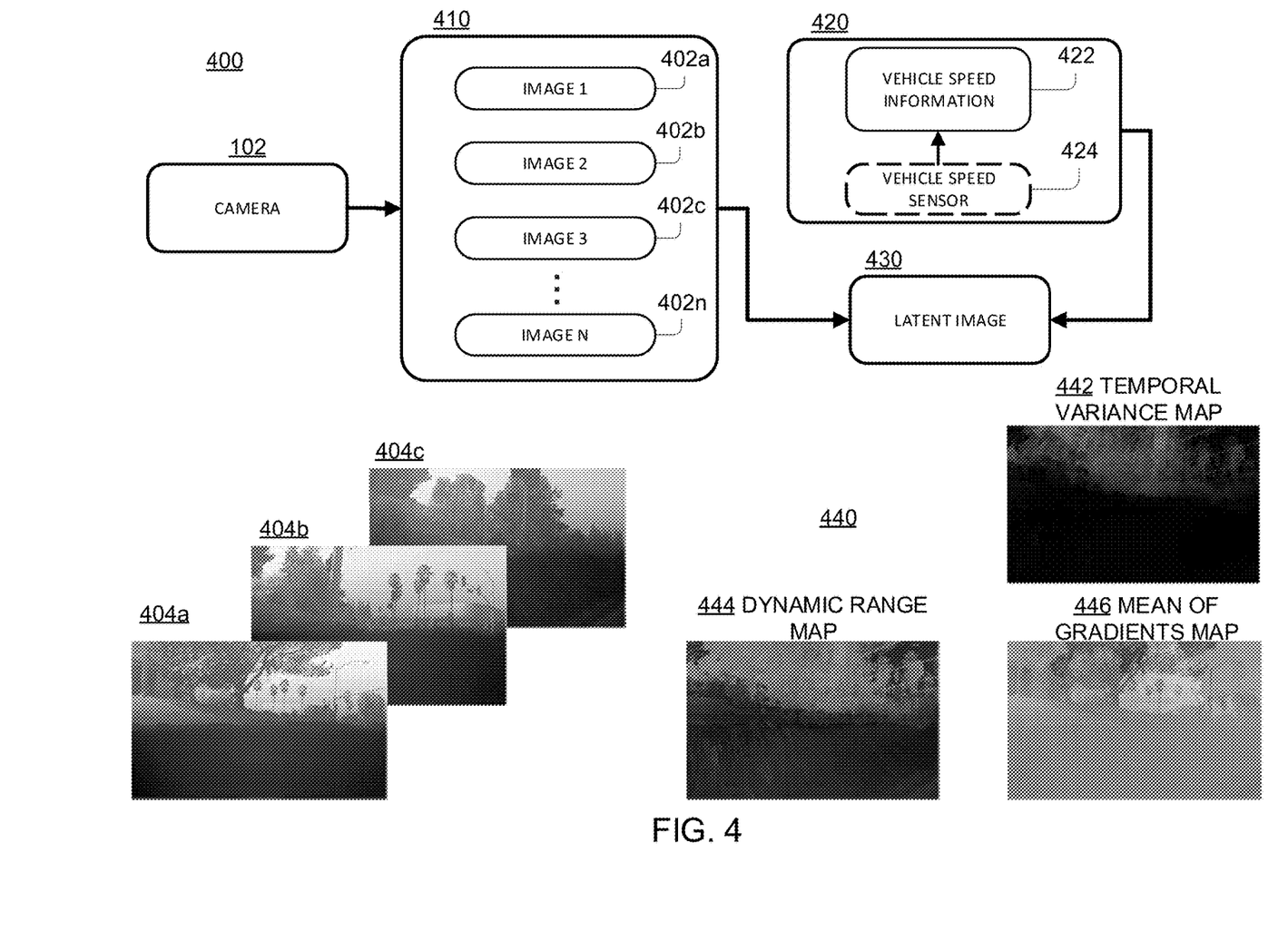
FIG. 4 depicts a flowchart of an illustrative process for generating a latent image, in accordance with some embodiments of the present disclosure.

FIG. 4 shows a diagram of an illustrative process for generating latent image 430, in accordance with some embodiments of the present disclosure. Process 400 may be performed by one or more processes or techniques described herein, for example, transform engine 310. Latent image generator 410 receives a plurality of images, for example, from camera 102. Although only a single camera 102 is described with respect to FIG. 4, any number of cameras can be used without departing from the contemplated embodiments. Additionally, latent image generator 410 may receive input images from a memory storage device, e.g., memory storage 370. As illustrated, latent image generator 410 receives images 402A, 402B, and 402C from camera 102. Although only three images (402A-C) may be shown and described, any number of images can be used, up to an including image 402N. Images 402A-402N are a series of images captured over a period of time and may be received from camera 102. For example, camera 102 mounted to moving vehicle 100 and oriented in the direction of travel (e.g., facing forward) results in series of images 404A-404C. Exemplary images 404A-404C depict the scenery around vehicle 100 as it traverses the roadway. Additionally, the system may utilize vehicle speed information 442 taken from, for example, vehicle speed sensor 424. Latent image generator 410 may use various techniques to generate latent image 430, including but not limited to pixel dynamic range, gradient dynamic range, and pixel absolute difference.

Pixel dynamic range (or "PDR") utilizes the total amount of variation for a pixel within a time frame over a series of images and, by way of example, may be expressed by the following:

$$PDR_{(i,j)} = \max_{k} I_{(i,j,k)} - \min_{k} I_{(i,j,k)}$$

where k is the image index with values from 1 to the number of images in the image sequence (e.g., 1 to N). The dynamic range feature captures activity occurring at a location among images 404A-C with respect to time. In some embodiments, the activity is captured by determining a minimum value and a maximum value among set of images 402A-402N at each location {i, j}. To illustrate, for each set of images (e.g., set of images 402A-402N), a single maximum value and a single minimum value are determined for each location {i, j} (e.g., at each pixel). In some embodiments, the dynamic range is determined as the difference between the maximum value and the minimum value, and is indicative of the amount of variation occurring for that region over the time interval (e.g., corresponding to set of images 402A-402N). The system may utilize vehicle speed information 422 generated from, for example, vehicle speed sensor 424, to determine whether the vehicle was moving with the input images were captured. To illustrate, if the region is degraded (by, for example the camera being partially blocked), the difference in maximum and minimum values would relatively small or even zero (i.e., not be relatively large). That is, regions of the latent images that may be degraded will have little to no variation over time. To illustrate further, the dynamic range feature may also help identify whether the region is degraded or not, especially in low light conditions (e.g., at night) when most of the image content is black. In some embodiments, the system may select all the pixels in a region or may subsample pixels of the region. For example, in some circumstances, selecting fewer pixels allows sufficient performance to be retained while minimizing computational load. In an illustrative example, the system may determine a mean value for each region of each image of a sequence of images (e.g., images 404A-404C) to generate a sequence of mean values for each region of a partition grid. The system determines a difference between a maximum value and a minimum value of the sequence of mean values for each location or region of the partition grid. Utilizing a pixel dynamic range technique, latent image generator 410 may output a pixel dynamic range map 444, which may be used as latent image 430.

In another exemplary embodiment, process 400 may determine one or more gradient values to be used as the latent image, also referred to as a gradient dynamic range ("GDR"). GDR represents the dynamic range of the input image gradients over a period of time (e.g., images 402A-402N). In contrast to a PDR metric that captures temporal variation, GDR allows some spatial information to be considered. To capture the spatial variation, the system determines an image gradient (e.g., or other suitable difference operator) using any suitable technique such as, for example, a Sobel operator (e.g., 3×3 matrix operators), a Prewitt operator (e.g., 3×3 matrix operators), a Laplacian operator (e.g., gradient divergence), a gradient of Gaussians technique, any other suitable technique, or any combination thereof. To illustrate, the system determines a range of gradient values at each region (e.g., at any pixel location, or group of pixels) over time (e.g., for a set of images) to determine the change in the gradient metric. Accordingly, the gradient dynamic range captures spatio-temporal information. In such an embodiment, the gradient or spatial difference determination captures the spatial variation whereas the dynamic range component captures the temporal variation. In an illustrative example, the system may determine the gradient difference by determining a gradient value for each region of each image of the series of images to generate a sequence of gradient values for each region and, for each respective sequence of gradient values, determining a difference among gradient values of the respective sequence of gradient values. In this way, the system determines the gradient differences (e.g., the gradient dynamic range) over the series of images and may output, for example, the gradient dynamic ranges averaged over a period of time. In an illustrative example, process 400 may consider images 404A to 404C as input images and output a mean of gradients map 446, which may be used as latent image 430.

In addition to implementing PDR and GDR techniques, process 400 may apply a pixel absolute value difference (or "PAD") technique. In such an example, process 400 may determine the difference, as a temporal feature, by capturing frame-to-frame variation in a scene occurring over a very short time interval (e.g., inverse of the frame rate). For example, in considering two consecutive image frames, the absolute difference between the two frames (e.g., difference in mean values) may capture this variation. In an illustrative example, the system may determine a difference value by determining a mean value for each region of a first image to generate a first set of mean values, determining a mean value for each region of a second image to generate a second set of mean values (e.g., the second image is temporally adjacent to the first image), and determining a difference between each mean value of the first set of mean values with a corresponding mean value of the second set of mean values (e.g., to generate an array of difference values). In an illustrative example utilizing a PAD technique, process 400 may consider images 404A to 404C as input images and output temporal variance map 442, which may be used as latent image 430.

In some embodiments, process 400 may combine one or more of the foregoing techniques to generate latent image 430. For example, process 400 may utilize images 404A-404C to output temporal variance map 442, dynamic range map 444, and mean of gradients map 446. Additionally, the system may perform one or more processes to combine some or all of the output maps 440 to generate latent image 430.

Figure 5A:
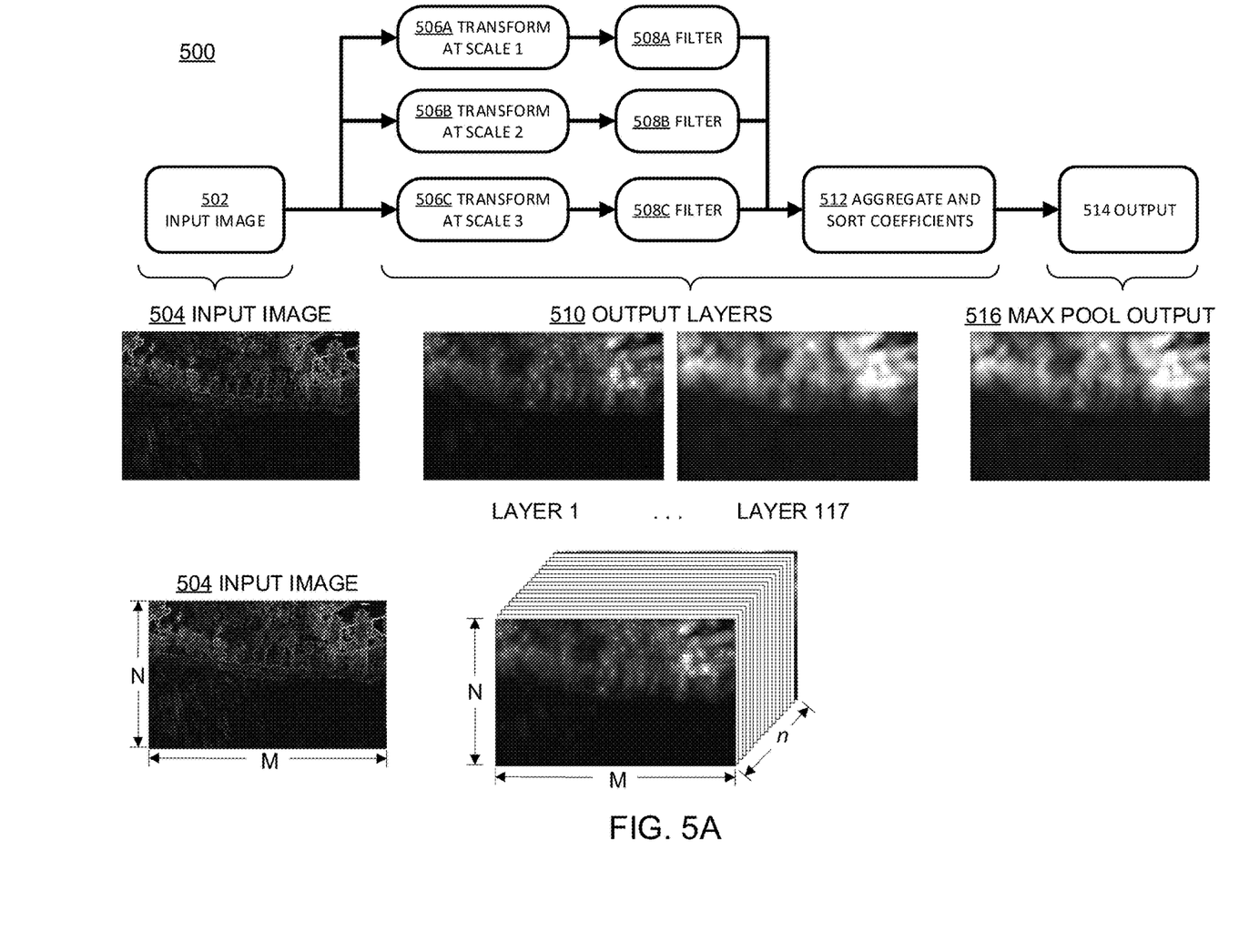
FIGS. 5A-5B depict an illustrative process applying a high frequency multiscale transform, in accordance with some embodiments of the present disclosure.

FIG. 5A depicts a flowchart of illustrative process 500 for determining image capture degradation of a camera sensor using a high frequency multiscale fusion transform (HiFT), in accordance with some embodiments of the present disclosure. The HiFT is used to perform a frequency domain analysis to find regions of the latent image with high and low frequency content. To illustrate, a transform (e.g., a DCT) is applied to express a spatial domain image (e.g., input image 504) as a linear combination of cosine functions of different frequencies. In this way, the areas of the latent image that contain high frequency content are identified indicating that those regions may not be experiencing image degradation and, conversely, regions of the latent image that contain low frequency content indicating that those regions may be experiencing image degradation. The image degradation may be caused by, for example, the camera being partially blocked. A latent image generated using one or more of the techniques described herein (e.g., latent image 430) may be applied at step 502 as input image 504. For example, input image 504 may be embodied by a latent image generated from a series of images captured by camera 102 by applying, for example, PDR, GDR, or PAD techniques. Although the input image 504 may be shown and described as a latent image (e.g., latent image 430), the input image can be any image without departing from the contemplated embodiments.

Figure 5B:
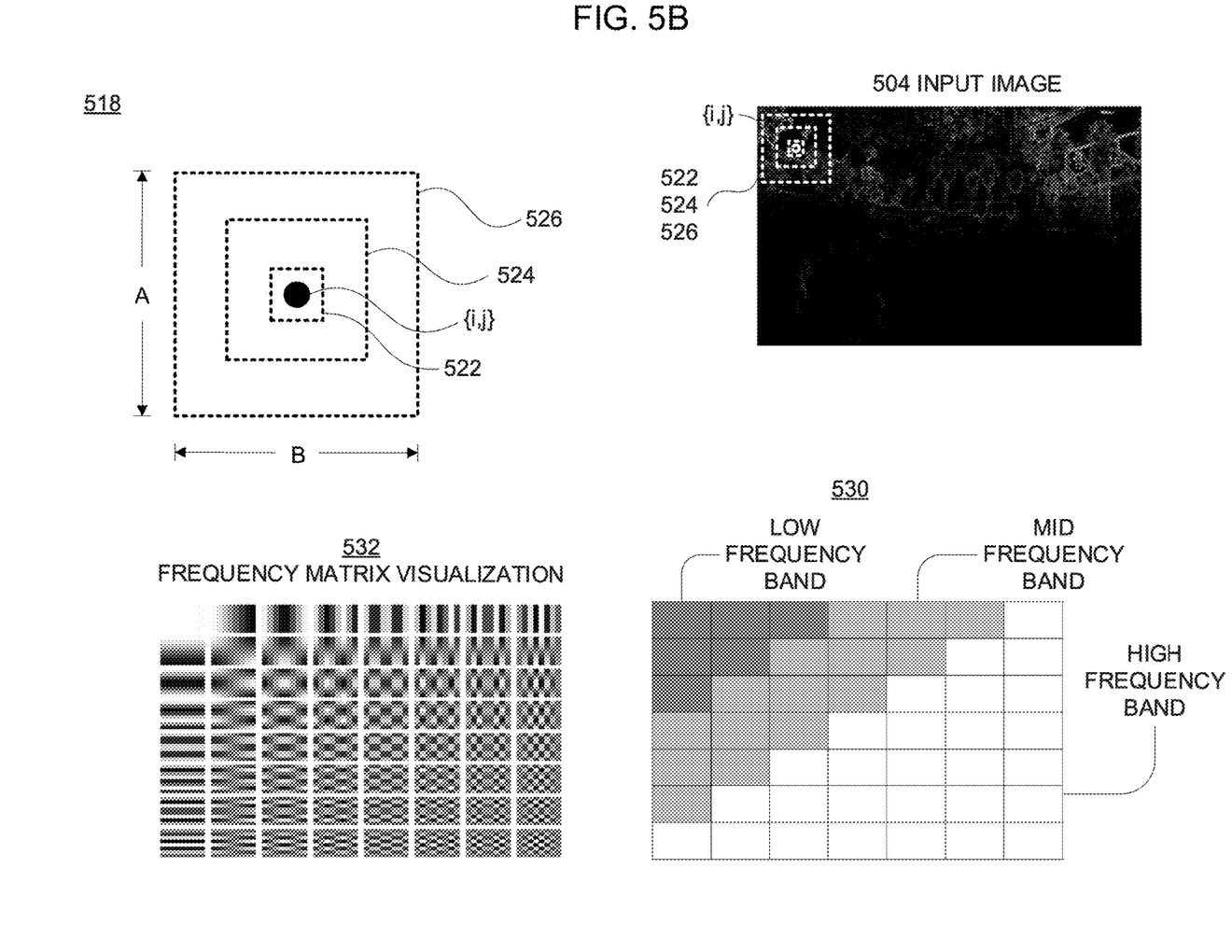

Applying the HiFT technique as illustrated in FIGS. 5A and 5B, latent image 430 is divided into regions comprising A×B blocks. In some embodiments, each block contains a single pixel. To illustrate such an embodiment, a 7×7 region contains 7×7 pixels (i.e., forty-nine pixels). In other embodiments, each block contains multiple pixels. To illustrate such an embodiment, each block may contain, for example, four pixels (e.g., 2×2 pixels), and the corresponding 7×7 region contains 196 pixels (forty-nine blocks each containing four pixels). Additionally, although each region may be shown and described as being square (i.e., A=B), A and B may be any integer without departing from the contemplated embodiments. Additionally, latent image 520 may be divided into different size regions. In such an embodiment, three different sized regions may be applied, each region reflecting a scale (or resolution). For example, region 522 comprises 5×5 pixels centered at pixel {i, j}, region 524 comprises 7×7 pixels centered at pixel {i, j}, and region 526 comprises 9×9 pixels centered at pixel {i, j}. Although three scales having resolutions of 5×5, 7×7, and 9×9 respectively, are shown and described, any number of scales having any resolution may be implemented without departing from the contemplated embodiments.

At steps 506A-506C, a transform is applied to each region at scale 1, scale 2, and scale 3, respectively, to express those spatial domain signals into linear combinations of cosine functions of different frequencies. For example and as shown at step 506B, region 524 comprises 7×7 blocks, each block corresponding to a pixel of latent image 520. Thus, region 524 contains 7×7 pixels, centered at pixel {i, j}. The 7×7 region defines scale 1. The value of each pixel relates to a visual parameter, for example, luminance. In such an embodiment, a pixel value of 0, for example, corresponds to a pixel that is black and a pixel value of 255 corresponds to a pixel that is white, and all values in between correspond to varying shades of gray. At steps 506A and 506C, transforms are similarly applied to region 524 (at scale 1) and region 526 (at scale 3), respectively. In this way, process 500 provides a multiscale (i.e., at scales 1-3) approach to determining camera blockage.

Applying a transform (e.g., a DCT transform) to each A×B region approximates each of those regions by A×B cosine functions, each having a coefficient (or magnitude) that corresponds to that particular function's contribution to the region as a whole. As illustrated by frequency matrix visualization 532, the approximating cosine waves increase in frequency from left to right (i.e., in the x-direction) and from top to bottom (i.e., in the y-direction). The resulting frequency matrix contains A×B spectral sub-bands, each sub-band comprising a transform coefficient relating to how much its corresponding cosine frequency contributes to the region. As illustrated, the highest frequency spectral sub-band is located in the lower right corner of decomposition 530 and, conversely, the lowest frequency spectral sub-bad is located in the upper-left corner.

At steps 508A-508C, all frequencies other than the high frequency coefficients are filtered. The presence of high frequency content in a region indicates that the region may not be experiencing image degradation. Thus, by filtering the low- and mid-frequency content, regions containing high frequency content are isolated, thereby indicating which regions are experiencing image degradation and which regions are pristine. Although 28 spectral sub-bands are illustrated as constituting the high frequency content, any number of spectral sub-bands may be considered high frequency content without departing from the contemplated embodiments. Additionally, the number of spectral sub-bands identified as high frequency may be altered by, for example, an input or output of transform engine 310, degradation map 320, smoothing engine 330, response engine 340, output 390, or a combination thereof.

At step 512, the spectral sub-bands are sorted according to their respective frequencies. A plurality of output frequency layers is generated, each frequency layer comprising all magnitudes of a particular spectral sub-band. Thus, each frequency layer represents an activation map with respect to a particular frequency. In the illustrative embodiment shown in FIG. 5A, 117 output layers 510 are generated as a result of applying a HiFT to input image 504 at three different scales. Each output layer 510 represents a particular frequency and the intensity of the luminance depicted in each layer represents the magnitude of the coefficient at each point (e.g., pixel) of that layer. For example, Layer 1 represents the lowest frequency decomposition resulting from the DCT applied to input image 504. As shown, the lighter areas of Layer 1 represent the locations that have the greater magnitudes of the lowest frequency. Contrastingly, the darker areas of Layer 1 represent the locations having the lowest magnitudes of the lowest frequency cosine function. In such an embodiment, the black portions of Layer 1 (having the lowest magnitudes) represent areas of input image 502 that are not influenced by the lowest frequency decompositions; on the other hand, the white (or lighter) portions of Layer 1 represent areas of input image 502 that are influenced by the lowest frequency decomposition. In such an example, the lighter the area of Layer 1, the more influence the lowest frequency has and, conversely, the darker the area, the lower the influence the lowest frequency contributes to input image 504.

At step 514, the areas of each layer that have the greatest activation are selected and aggregated. In an embodiment, output frequency layers 510 are compared and the maximum coefficient values at each location are used to create output layer 516. In such an embodiment, each location (e.g., each pixel) of each layer is compared to the corresponding locations of all other layers. The frequency corresponding to the highest coefficient value is added to output layer 516. In this way, the frequency corresponding to the highest coefficient value is selected and added to output layer 516. The resulting output layer 516 comprises an amalgam of each layer's highest activation at each frequency, and represents the highest frequency content at each location within input image 504.

Figure 6A:
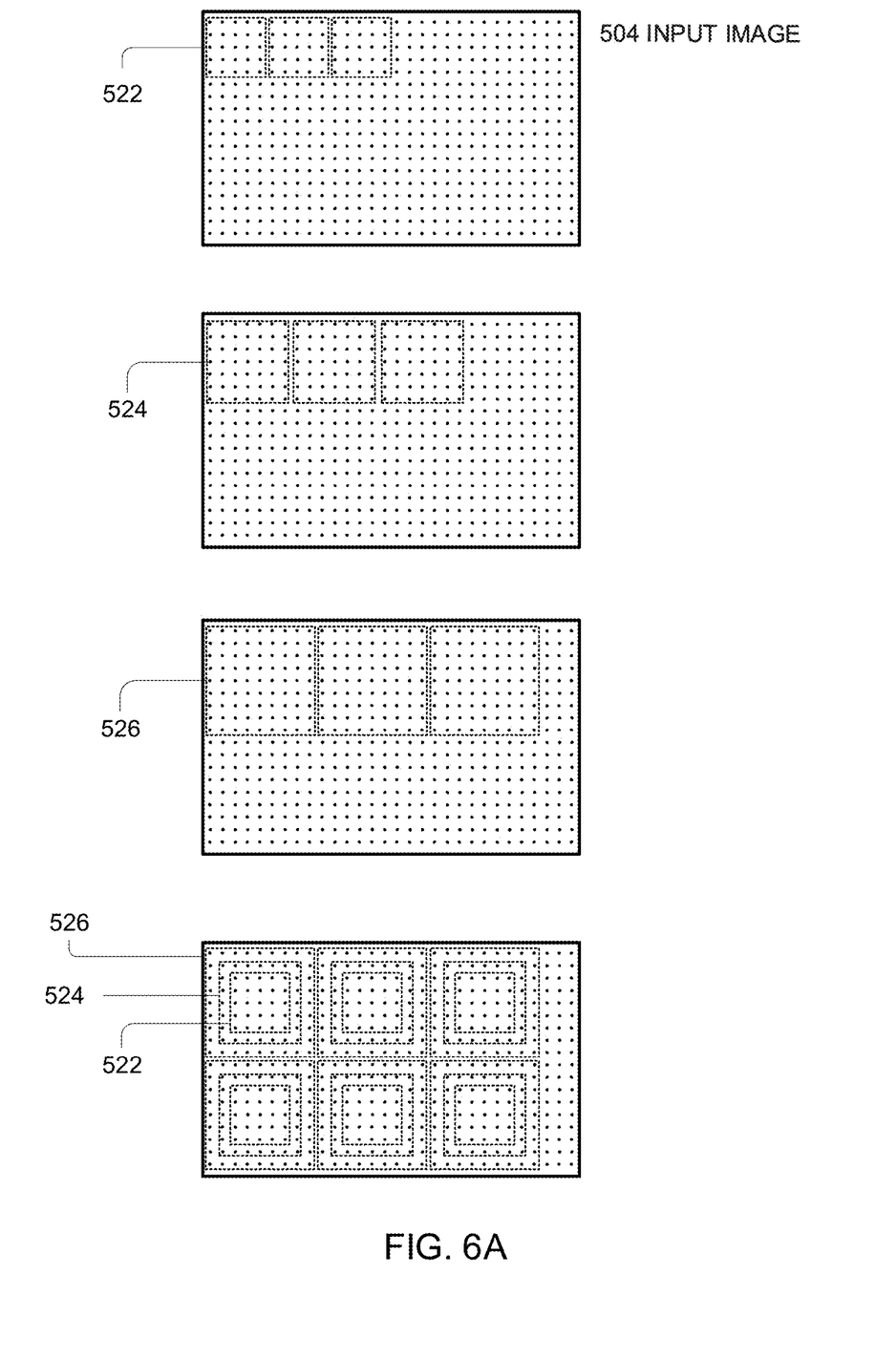
FIGS. 6A-6B depict illustrative regions, in accordance with some embodiments of the present disclosure.
Figure 6B:
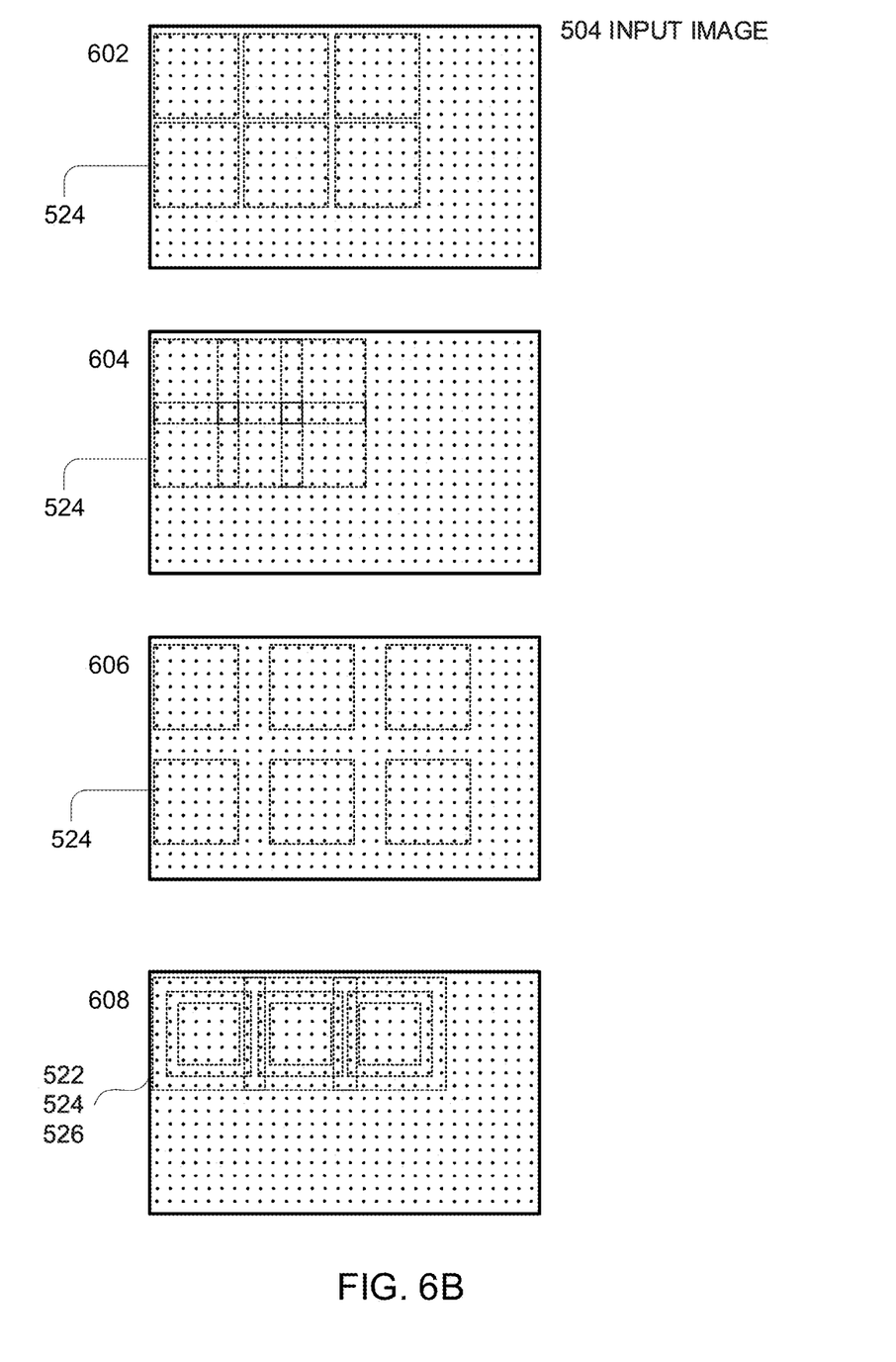

FIGS. 6A and 6B depict various sizes and orientations of regions that are applied in an exemplary HiFT, in accordance with some embodiments of the present disclosure. FIG. 5B depicts region 522 comprising 5×5 blocks, region 524 comprising 7×7 blocks, and region 526 comprising 9×9 blocks. In applying an exemplary HiFT, for example at step 506A, latent image 520 may be divided into a plurality of regions 522, each region 522 comprising 5×5 blocks, and each block containing a pixel. The entirety of latent image 520 is divided in this fashion so that the entirety of latent image 520 divided into regions.

As depicted in FIG. 6B, input image 504 is decomposed into a plurality of regions 524, each comprising 7×7 blocks. Although only six regions may be depicted and described with respect to FIG. 6B, any number of regions may be implemented without departing from the contemplated embodiments. In an exemplary embodiment as illustrated by panel 602, input image 504 may be decomposed evenly, wherein each block (or pixel) is contained within a single region. In another exemplary embodiment as illustrated by panel 604, input image 504 may be decomposed into a plurality of overlapping regions 524. Although each region 524 is shown as overlapping by two blocks (or pixels), any amount of overlap may be implemented without departing from the contemplated embodiments. In another exemplary embodiment as illustrated by panel 606, input image 504 may be decomposed into a plurality of regions 524 such that each region 524 is separated by one or more blocks (or pixels). Although each region 524 is illustrated as being separated by two blocks (or pixels), regions 524 may be separated by any number of blocks (or pixels) without departing from the contemplated embodiments.

Figure 7:
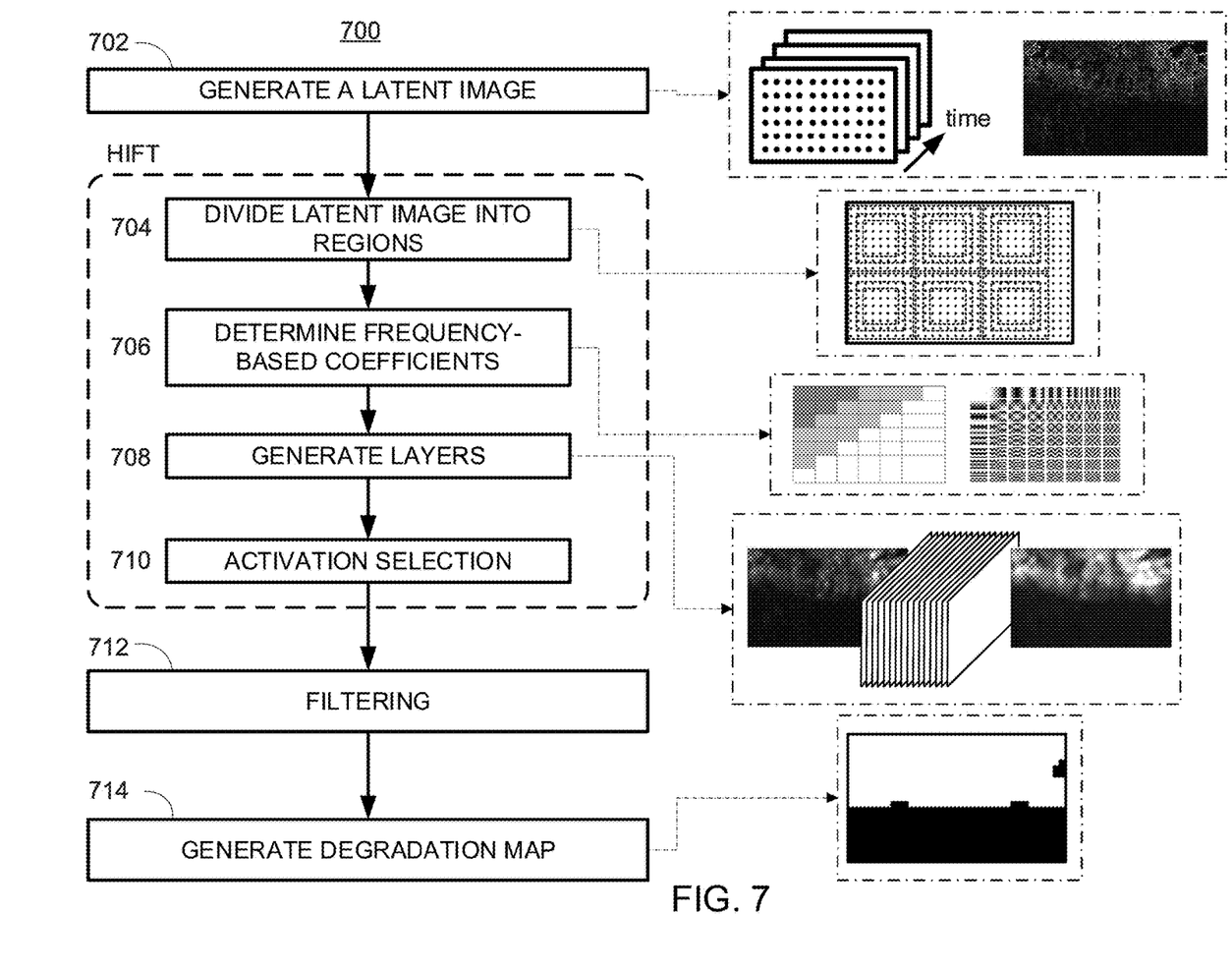
FIG. 7 depicts a flowchart of an illustrative process for determining image capture degradation of camera sensor, in accordance with some embodiments of the present disclosure.

FIG. 7 depicts a block diagram of illustrative method 700 for determining image capture degradation using a high frequency multiscale fusion transform (HiFT), in accordance with some embodiments of the present disclosure. In some embodiments, process 700 is implemented by a system such as, for example, any of the illustrative systems and techniques shown and described with respect to FIGS. 3-6. In some embodiments, process 700 is an application implemented on any suitable hardware and software that may be integrated into a vehicle, communicate with systems of a vehicle, include a mobile device (e.g., a smartphone application), or a combination thereof.

At step 702, the system generates a latent image. A series of images captured by, for example, camera 102, are processed to indicate the temporal and/or spatial variation among the series of images. In an embodiment, the pixel dynamic range is determined for the series of images, resulting in a latent image that comprises the total amount of variation for each pixel within a certain time frame (e.g., a time frame corresponding to the duration in which the series of images were captured). In another embodiment, the gradient dynamic range of the series of images is determined, resulting in a latent image that comprises the dynamic range of the image gradients of the series of images. In such an embodiment, the image gradient can be the output of a sobel filter over the series of images. In this way, the resulting latent image comprises spatio-temporal information of the series of images. In another embodiment, the latent image is generated by determining the temporal variance of corresponding pixels over the series of images. In such an embodiment, each pixel's value of the resulting latent image corresponds to the temporal variation that pixel experiences over the series of images.

At step 704, the system divides the latent image into a plurality regions. Each region contains A×B blocks, wherein A and B can be any integer greater than zero. In some embodiments, the regions are the same size (i.e., the same resolution). In other embodiments, the system divides the latent image into different sized regions (i.e., different resolutions). To illustrate such an embodiment, the system divides the latent image into regions having three different resolutions, for example, 5×5 blocks, 7×7 blocks, and 9×9 blocks, each block containing one pixel.

At step 706, the system determines the frequency-based coefficients. The system performs a transform on each region, for example, a discrete cosine transform (DCT). The DCT decomposes each region into spectral sub-bands, each having a frequency and coefficient. The coefficient (or magnitude) of each spectral sub-band indicates its corresponding frequency's influence on the decomposed region. The system separates the spectral sub-bands of each region into high-, mid-, and low-band frequencies. The system filters the low- and mid-band frequencies, leaving only the high-band frequencies.

At step 708, the system then generates a plurality of frequency layers. Each frequency layer corresponds a spectral sub-band frequency. In an illustrative example where the system decomposes the latent image into regions comprising 7×7 blocks (or pixels), the decomposition results in a 7×7 matrix comprising 49 cosine functions (or spectral sub-bands), each having a frequency coefficient (or magnitude). After filtering the low- and mid-band frequencies, the 28 high-band frequencies remain. The system then generates 28 frequency layers, each layer corresponding to one of the 28 remaining high-band frequencies and comprising the coefficients (magnitudes) of the frequencies.

At step 710, the frequency layers are aggregated into a single layer comprising the highest coefficients of the plurality of layers. In an embodiment, the layers with the highest activation (i.e., the highest coefficients) are aggregated using, for example, max pooling. In such an embodiment, each coefficient in each layer is compared to other coefficients at corresponding locations. In this way, the system identifies the frequency having the highest activation at each location (e.g., at each pixel) among the plurality of layers. The resulting activation map contains the highest frequency with the highest coefficients.

At step 712, the activation map is filtered. In an embodiment, a local entropy filter is applied to the activation map. Entropy is a statical measure of randomness and, applied as a local entropy filter, characterizes the texture (i.e., the density of high frequency content) of an image by providing information about the local variability of the intensity values of pixels in an image. Where an image has dense texture (i.e., experiences high frequency content), the result of local entropy filtering will be low. Conversely, where the image experiences sparse texture (i.e., experiences low frequency content), the result of local entropy filtering will be high. To illustrate, when a local entropy filter is applied to the activation map, the areas that have little content will produce high entropy values and the areas that have more content will produce low entropy values. In this way, the system determines what areas of the activation map may be experiencing image degradation (by resulting in high values) and which areas are likely not experiencing image degradation (by resulting in low values). In some embodiments, the output of the local entropy filter may be filtered using an edge aware smoothing technique, for example, a guided filter or a domain transform edge preserving recursive filter.

Figure 8:
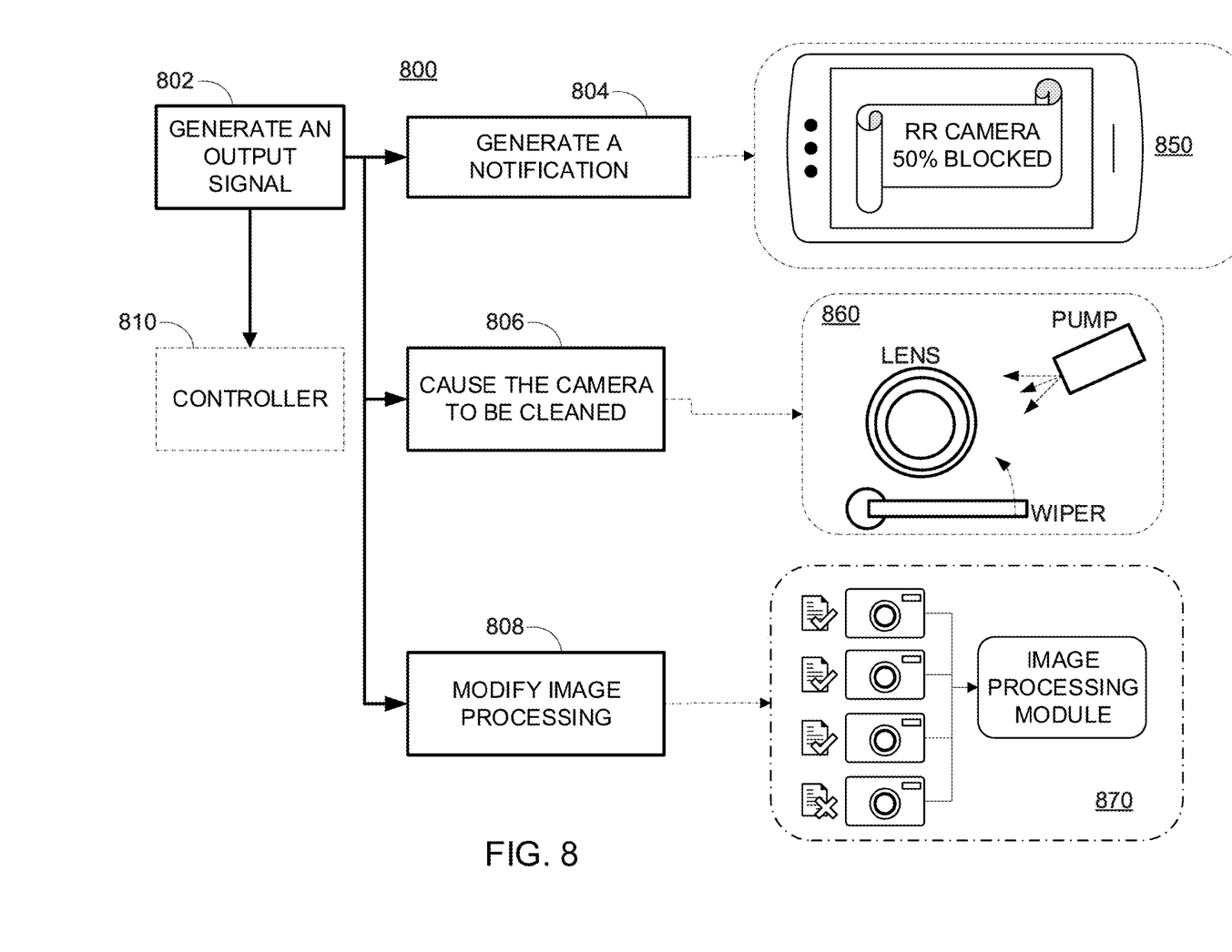
FIG. 8 depicts a flowchart of an illustrative process for managing image capture degradation of a camera sensor and response, in accordance with some embodiments of the present disclosure.

FIG. 8 shows a flowchart of an illustrative process 800 for determining image capture degradation, in accordance with some embodiments of the present disclosure. In some embodiments, process 800 or aspects thereof may be combined with any of the illustrative steps of processes 300, 500, or 700.

At step 802, the system generates an output signal. For example, step 802 may the same as step 514 of process 500 of FIG. 5. In another example, step 802 may be the same as step 714 of process 700 of FIG. 7. The system may generate and provide the output signal to, for example, an auxiliary system, an external system, a vehicle system, a controller, any other suitable system, a communications interface thereof, or any combination thereof.

At step 804, the system generates a notification. In some embodiments, the system provides an output signal to a display system to generate a notification. For example, the notification may be displayed on a display screen such as a touchscreen of a smartphone, a screen of a vehicle console, any other suitable screen, or any combination thereof. In a further example, the notification may be provided as an LED light, console icon, a visual indicator such as a warning message, a highlighted area of the video feed corresponding to degradation, a message (e.g., a text message, an email message, an on-screen message), any other suitable visual or audible indication, or any combination thereof. To illustrate, panel 850 illustrates a message overlaid on a display of a touchscreen (e.g., of a smartphone or vehicle console), indicating that the right-rear (RR) camera (e.g., camera 104) is 50% blocked. To illustrate further, the notification may provide an indication to the user (e.g., a driver or vehicle occupant) to clean the camera, disregard images from the camera that are experiencing degradation, or otherwise factor the degradation into considering images from the camera.

At step 806, the system causes the camera to be cleaned. In some embodiments, the system provides an output signal to a cleaning system (e.g., a washing system) to spray water or other liquid on a camera face (e.g., or enable a mechanical clean such as a wiper) to clear a blockage contributing to image degradation. In some embodiments, the output signal causes a wiper motor to reciprocate a wiper across the camera lens. In some embodiments, the output signal causes a liquid pump to activate and pump a cleaning fluid towards the lens (e.g., as a spray from nozzle coupled by a tube to the pump). In some embodiments, the output signal is received by a cleaning controller, which controls operation of a cleaning fluid pump, a wiper, or a combination thereof. To illustrate, panel 860 illustrates a pump and a wiper configured to clean a camera lens. The pump sprays cleaning fluid towards the lends to dislodge or otherwise dissolve/soften the blockage, while the wiper rotates across the lens to mechanically clear the blockage.

At step 808, the system modifies image processing. In some embodiments, the system provides an output signal to an imaging system of a vehicle. For example, a vehicle may receive images from a plurality of cameras to determine environmental information (e.g., road information, pedestrian information, traffic information, location information, path information, proximity information) and accordingly may alter how images are processed in response to image degradation. To illustrate, panel 870 illustrates an image processing module that takes as input images from four cameras (e.g., although any suitable number of cameras may be implemented, including one, two, or more than two). As illustrated in panel 870, one of the four cameras experiences image degradation that is caused by a blockage (e.g., indicated by the "x"), while the other three cameras do not (e.g., indicated by the check marks). The image processing module may, in some embodiments, disregard output from the camera exhibiting image degradation, disregard a portion of images from the camera exhibiting blockage, lessen a weight or significance associated with the camera exhibiting degradation, any other suitable modification to considering the entirety of the output of the camera exhibiting degradation, or a combination thereof. The determination whether to modify image processing may be based on the extent of degradation (e.g., the relative amount of blocked pixels to total pixels), shape of degradation (e.g., a largely skewed aspect ratio such as a streak blockage might be less likely to trigger modification than a more square aspect ratio), which camera is identified as capturing images exhibiting degradation, time of day or night, user preference (e.g., included in reference information as a threshold or other reference), or a combination thereof.

In some embodiments, at step 808, the system disregards a portion of the output of the camera. For example, the system may disregard, or otherwise not include during analysis, the portion of the camera output corresponding to the degradation mask. In a further example, the system may disregard a quadrant, a half, a sector, a window, any other suitable collection of pixels having a predetermined shape, or any combination thereof based on the degradation mask (e.g., the system may map the degradation mask to a predetermined shape and then size and arrange the shape accordingly to indicate the portion of the camera output to disregard).

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method for determining image capture degradation, the method comprising:
    capturing, via one or more sensors, a series of image frames by a camera of a vehicle over time;
    generating, using processing circuitry, a latent image from the series of image frames captured by the camera, the latent image representing temporal or spatial differences among the series of image frames over time;
    generating, using processing circuitry and based on the latent image, a plurality of frequency layers, wherein each frequency layer corresponds to a frequency-based decomposition of the latent image at a respective scale and frequency; and
    identifying, using the processing circuitry, image capture degradation of the camera based on the plurality of frequency layers.

2. The method of claim 1, wherein generating the plurality of frequency layers comprises determining, for each of a plurality of scales centered at each of a plurality of positions in the latent image, a plurality of frequency-based coefficients, wherein the plurality of frequency-based coefficients correspond to a plurality of spectral sub-band frequencies, and wherein each of the plurality of frequency layers comprises frequency-based coefficients for a respective one of the spectral sub-band frequencies, and wherein identifying image capture degradation comprises selecting a subset of the coefficients based on a frequency magnitude threshold.

3. The method of claim 2, wherein generating a plurality of frequency layers further comprises:
    selecting a subset of coefficients based on their frequency;

sorting the subset of frequency-based coefficients with respect to magnitude; and normalizing the sorted subset of frequency-based coefficients to generate the plurality of layers.

4. The method of claim 1, wherein the camera captures the series of image frames at a sample frequency and wherein the sample frequency is determined based on vehicle speed.

5. The method of claim 1, wherein the latent image is generated based on pixel dynamic range, wherein pixel dynamic range is determined by a difference in each pixel's value in the series of image frames.

6. The method of claim 1, wherein the latent image is generated based on gradient dynamic range, wherein gradient dynamic range is determined by a difference in image gradients in the series of image frames.

7. The method of claim 6, wherein the image gradient is determined based on a sobel filter.

8. The method of claim 6, wherein the image gradient is determined based on a bilateral filter.

9. The method of claim 1 further comprising:

identifying image frames captured by the camera when the vehicle is travelling at a speed lower than a predetermined threshold; and excluding, from the series of image frames, the identified image frames;

wherein image frames are excluded from the series of image frames when vehicle speed is below a predetermined threshold.

10. The method of claim 2 further comprising adjusting the frequency magnitude threshold based on one or more of the plurality of frequency layers.

11. The method of claim 1 further comprising:

determining, based on the identified image capture degradation, whether blockage is present; and in response to determining that blockage is present, causing a fluid to be applied to a face of the camera.

12. The method of claim 1 further comprising causing to be generated a notification indicative of image capture degradation.

13. The method of claim 1 further comprising disregarding one or more regions of one or more the image frames based on the identified image capture degradation.

14. A system for determining image capture degradation:

a camera;

control circuitry coupled to the camera and configured to:

capture, via one or more sensors, a series of image frames by the camera over time;

generate a latent image from the series of image frames captured by the camera, the latent image representing visual differences among the series of image frames over time;

generate a plurality of frequency layers based on the late image, each frequency layer corresponding to a frequency-based decomposition of the latent image at a respective scale and frequency; and identify image capture degradation of the camera based on the plurality of frequency layers.

15. The system of claim 14, wherein the camera is integrated into a vehicle, and wherein the camera captures the series of image frames at a sample frequency based on the vehicle's speed.

16. The system of claim 15, wherein the control circuitry is further configured to:

identify image frames captured by the camera when the vehicle is travelling at a speed lower than a predetermined threshold; and exclude, from the image frames, the identified image frames.

17. The system of claim 14, wherein the control circuitry disregards the camera output.

18. The system of claim 14 further comprising a washing system, wherein the washing system applies a fluid to the face of the camera.

19. The system of claim 14 further comprising a display device configured to display a notification indicative of a blockage event.

20. A non-transitory computer readable medium comprising:

program instructions for determining image capture degradation, the program instructions when executed causing a computer processing system to execute steps including:

capturing, via one or more sensors, a series of image frames by a camera of a vehicle over time;

generating, using control circuitry, a latent image from the series of image frames captured by the camera, the latent image representing temporal or spatial differences among the series of image frames over time;

generating, using control circuitry and based on the latent image, a plurality of frequency layers, each frequency layer corresponds to a frequency-based decomposition of the latent image at a respective scale and frequency; and identifying, using control circuitry, image capture degradation of the camera based on the plurality of frequency layers.

\* \* \* \* \*